United States Patent [19]

Eian

[11] 4,443,354

[45] Apr. 17, 1984

[54] SORBENT MATERIAL FOR REDUCING FORMALDEHYDE EMISSION

[75] Inventor: Gilbert L. Eian, White Bear Lake, Minn.

[73] Assignee: Minnesota Minning and Manufacturing Company, St. Paul, Minn.

[21] Appl. No.: 362,309

[22] Filed: Mar. 26, 1982

[51] Int. Cl.$^3$ .................... B01J 20/32; B01J 19/04; B01D 53/14

[52] U.S. Cl. .................... 252/190; 252/184; 55/387; 428/528; 428/535; 428/541; 502/401; 502/404; 502/515; 568/422

[58] Field of Search ............... 252/190, 184, 428, 435, 252/436, 438, 439, 451; 55/387; 428/541, 535, 528; 524/17, 18, 21; 568/422

[56] References Cited

U.S. PATENT DOCUMENTS

| | | | |
|---|---|---|---|
| 2,321,958 | 6/1943 | Walker | 528/265 |
| 2,870,041 | 1/1959 | Waddle et al. | |
| 3,049,399 | 8/1962 | Gamson et al. | 423/599 |
| 3,226,332 | 12/1965 | Lincoln et al. | 252/186.32 |
| 3,400,079 | 9/1968 | Clifford et al. | 252/189 |
| 3,983,084 | 9/1976 | Alexander et al. | 428/528 |
| 4,186,242 | 1/1980 | Holmquist | 428/535 |
| 4,282,119 | 4/1981 | Tinkelenberg et al. | |
| 4,397,756 | 8/1983 | Lehmann | 428/528 X |

*Primary Examiner*—Benjamin R. Padgett
*Assistant Examiner*—Matthew A. Thexton
*Attorney, Agent, or Firm*—Cruzan Alexander; Donald M. Sell; Edward T. Okubo

[57] ABSTRACT

Granular sorbent material comprising a granular high surface area support impregnated with a water soluble, essentially non-volatile primary or secondary amine with equivalent weight less than about 400 and bearing either zero or two carbonyl substituents attached directly to the amino nitrogen atom is disclosed. The resulting material can be used as the filtration media in respirators, powered air purifiers, room air purifiers, ventilation filters, exhaust filters, process gas filters and the like to reduce the formaldehyde content of air.

10 Claims, No Drawings

SORBENT MATERIAL FOR REDUCING FORMALDEHYDE EMISSION

The present invention relates to a granular high surface area sorbent for reducing the formaldehyde content of an atmosphere.

Formaldehyde has been reported to be one of the five most commonly used chemicals and in 1980, 5.77 billion pounds of formaldehyde were produced in the United States. Formaldehyde is found in products ranging from antiperspirants to wood products, principally particle board and plywood.

Formaldehyde is known to be a strong irritant and sensitizer. Exposure to formaldehyde at even low levels causes irritation of the eyes, nose, and throat. Repeated or long-term exposure to formaldehyde has resulted in prolonged eye, nose and throat irritation, coughing, wheezing, diarrhea, nausea, vomiting, headaches, dizziness, lethargy, irritability, disturbed sleep, olfactory fatigue and skin irritation. Persons sensitized to formaldehyde and persons with hyperactive airways may respond even more severely upon exposure to formaldehyde.

Commercial products for formaldehyde filtration are currently available. One such material is used as the active agent for room air purification and comprises granules of activated alumina impregnated with potassium permanganate and is available as Purafil Chemisorbent from Purafil Inc. The use of this material for air purification has been described in U.S. Pat. No. 3,049,399. The preparation of granular alumina impregnated with solid oxidizing agent such as potassium permanganate is described in U.S. Pat. No. 3,226,332. While those granules are somewhat effective in filtering formaldehyde vapors from ambient air, they have been found to have a short service life. A similar material is available as Unisorb Air Purification Spheres from Tegal Scientific, Inc.

Another commercially available material comprises activated carbon granules impregnated with copper and chromium salts and is available from Barnebey-Cheney as Activated Carbon Type CI sorbent (6×10 mesh). This material also suffered from a short service life to formaldehyde vapor.

Still another commercially available sorbent material, which showed some effectiveness in filtering formaldehyde vapors, comprises activated carbon granules impregnated with copper and chrome salts and is available from the Norton Company as formaldehyde cartridge number N 7500-5 (12×30 mesh).

Prior workers have reported various reactions of formaldehyde with amines, related compounds, sulfonate salts and sulfonamide derivatives in solution. See for example, Walker, Formaldehyde, Third Edition, Reinhold Publishing Corporation, 1964, Kirk-Othmer Encyclopedia of Chemical Technology, Second Edition, Vol. 19, p. 244, Interscience, New York 1969; Wood, et al, Journal of the Society of Chemical Industry, 346T (1933); and Walder, U.S. Pat. No. 2,321,958. Reaction products having utility as flame retardants and surfactants have been reported. Thus see Vollmer, German Pat. No. 2,432,271, Chem. Abstr., 84:150755y and Orthmer et al., U.S. Pat. No. 2,243,437, Chem. Abstr., 35:5600, 2.

Resinous materials prepared by reaction of formaldehyde with amino or phenolic compounds in the presence of sulfonic acid or sulfamate salts are known from Mayer, German OS No. 1,908,094, Chem. Abstr. 73:99596r and Keller, South African Pat. No. 68-07,095, Chem. Abstr. 71:82046x.

Air cleaning applications of sulfonic acid solutions and extrudates of sulfamates with clay binders have also been reported by Koetting in German OS No. 2,226,955, Chem. Abstr. 80:73897j; and Suzuki et al in Japanese Kokai No. 73-102,077, Chem Abstr. 80:136987m. Suzuki et al report in Japanese Kokai No. 73-102,078, Chem. Abstr. 81:16333u that one such extrudate has activity against formaldehyde. See also U.S. Pat. No. 3,400,079.

Other agents such as urea are known which react with formaldehyde in solution and on clay supports. See Hayashi, Japanese Kokai, No. 78-09,709, Chem. Abstr. 88:157843s.

Sorbents for removal of formaldehyde in gaseous systems made by impregnation of activated charcoal with various ammonium or hydrazinium salts have been described by Japanese workers in Sugai, et al., Japanese Kokai No. 78-29292, Chem Abstr. 89:11487c, and Yoshino, Japanese Kokai No. 73-93,580, Chem. Abstr. 80:99785w.

Granular carbon impregnated with alkali metal cyanides are reported to remove formaldehyde from exhaust gases, Fukunaga, Japanese Kokai No. 74-21,111, Chem. Abstr., 81:25092s.

Certain molecular sieves are also reported to absorb formaldehyde, see Chachulski, et al., Chemik 18, 252-5 (1965) Chem. Abstr. 64:9279g.

Reported methods for reducing the emission of formaldehyde from plywood, treated fabrics and the like include treatment of the article with sulfite salts, Miwa, Japanese Kokai No. 74-66,804, Chem. Abstr., 82:32698t, urea, Hojo, Japanese Kokai No. 74-75,709, Chem. Abstr., 82:32704s or multivalent metal salts, Okifuji, Japanese Pat. No. 74-14,440, Chem. Abstr. 83:61555v. Wrappings made from paper impregnated with ammonium sulfamate is also reported to reduce emission of formaldehyde containing plywood, Miwa, Japanese Kokai, No. 74-124,207, Chem. Abstr. 83:12586x.

Aqueous solutions of the tertiary amine urotropine have been used to collect gaseous formaldehyde. See Fadeev, et al., USSR Pat. No. 189,825, Chem. Abstr. 67:108214v.

A polyol (trimethylolpropane) has been reported as enhancing the formaldehyde absorbing capacity of sodium sulfite solution by Ishida et al., Japanese Kokai No. 73-85,484, Chem. Abstr. 80:87100f.

It has been reported that 2-amino-1-naphthyl hydrogen sulfate and formaldehyde react on charcoal to yield 2-methylamino and 2-formamido-1-naphthyl hydrogen sulfate, the reaction occurring in water solution, by Boyland et al., Biochemical Journal, (1966) 99, p. 189 et seq.

SUMMARY OF THE INVENTION

The present invention relates to a granular high surface area sorbent material for removing formaldehyde from ambient air at room temperature. The formaldehyde content of the air is reduced by reaction of the formaldehyde with the granular high surface area solid support impregnated with a water soluble, essentially non-volatile primary or secondary amine with equivalent weight less than about 400 and bearing either zero or two carbonyl substituents attached directly to the amino nitrogen atom.

The granular sorbent material of this invention is formulated by immersing granular high surface area solid support material in an impregnating solution, removing the excess solution by filtration and drying in an air circulating oven. The resulting granular product is particularly useful as the active component of respirators, powered air purifiers, room air purifiers, ventilation filters, exhaust filters, process gas filters and the like to effectively remove formaldehyde from an ambient atmosphere.

DETAILED DESCRIPTION OF THE INVENTION

Formaldehyde is a reactive chemical species capable of undergoing polymerization, condensation, addition, oxidation and reduction reactions. Although the chemistry of formaldehyde has been extensively studied, effective formaldehyde sorbent filter media for use in respirators, air filters and the like are not well known. This situation exists in spite of the serious health effects produced by human exposure to formaldehyde gas and the widespread use of materials containing free formaldehyde.

Although many compounds are known to react with formaldehyde in solution, an understanding of these solution reactions is not sufficient to predict the utility of reactants in gas phase sorbents made by depositing the reactants on high surface area supports. For example, strong acids, phenol in acid solution, urea, and strong alkalis are known to react readily with formaldehyde in solution but do not react with gas phase formaldehyde when deposited on activated carbon.

Some amino compounds are known to form methylolamines on reaction with formaldehyde in solution. These products may undergo further reactions, either with additional formaldehyde or by self-reaction. It has now been discovered that certain of these amino compounds are capable of reacting with gas phase formaldehyde when the amino compounds are deposited on high surface area supports and that these impregnated high surface area supports are useful as sorbent filter media for formaldehyde.

To provide a basis for comparison of different reactants as impregnating agents, one specific granular high surface area support was chosen, Witco 965 activated carbon 12×20 mesh size. Activated carbon of this particle size is useful as sorbent filter media for organic vapor respirators, but the raw carbon has little capacity for formaldehyde. The candidate sorbents were prepared by immersion of the carbon in a solution of the agent, removing excess solution by filtration, and drying in an air circulating oven. These granular impregnated sorbents were loaded into air purifying respirator type filter beds and evaluated under conditions similar to those used for bench testing of chemical cartridge respirators as described in Federal Register Vol. 37, No. 59, Part II (1972). Although this document does not specify test conditions for formaldehyde respirators, it does define standard conditions of air flow, temperature and relative humidity for testing sorbents and respirators against other gases and vapors such as carbon tetrachloride, several acid gases, ammonia and methylamine. A challenge concentration of 100 ppm formaldehyde was chosen for the bench test. This challenge is 33 times the current established OSHA permissible exposure limit, 50 toimes the ACGIH recommended exposure limit and 100 times the NIOSH recommended exposure limit for workplaces. The Federal Register tests set forth above utilize challenge concentrations of 20–500 times the permissible exposure limit for NIOSH certification of chemical cartridge respirators for the gases and vapors noted above.

Approximately 195 cc of the candidate sorbent material was loaded into a filter bed with a cross-sectional area of 61 $cm^2$ and a depth of 3.2 cm. Air containing 100 ppm formaldehyde and 50% relative humidity at 32° C. was passed through the filter bed at a constant flow rate of 64 liters per minute. Formaldehyde vapor was generated by metering a dilute formalin solution into a heated vaporization chamber in the test air line. Concentration of formaldehyde in the challenge air and downstream from the filter was measured using a commercial formaldehyde in air monitor (CEA Model 555 available from CEA Instruments, Inc.). The initial formaldehyde concentration in air downstream from the filter was zero. Service life of the test sample was recorded in minutes required for the formaldehyde level in the effluent air to react 1 ppm.

The observed service life depends on the reactivity of the impregnating agent deposited on the high surface area support toward gas phase or weakly adsorbed formaldehyde. Reactivity in solution cannot be strictly related to reactivity on the solid support towards gas phase formaldehyde. In order to be classified as a practical sorbent, the reactivity of the deposited agent should be sufficient to significantly increase service life of the impregnated sorbent over the untreated solid support. For air purifying respirators, the sorbent filter should effectively reduce contaminant level in breathing air from a hazardous ambient level to zero. Respirator filter design may dictate the use of various different particle size sorbents. The observed service life will also depend on sorbent particle size, filter area, sorbent bed depth and the concentration of impregnating solution. For practical application, sorbent reactivity and respirator design should provide service life, as measured by the above bench test, of at least 90 minutes and preferably 120 minutes or more.

The invention will become more readily apparent from the following examples:

EXAMPLES 1–26

100 parts of activated carbon (Witco 965, 12×20 mesh from Witco Chemical Company) was added to 200 parts of an aqueous solution generally containing 20% by weight of the impregnating agent. After soaking for about sixty minutes, the excess solution (about 60% of the original 200 parts) was filtered from the solid particles and the moist carbon granules were dried in trays in an air circulating oven at 100°–110° C. until the remaining moisture content was 2% or less. Service life was determined by the bench test described above and reported in the table below.

| Example | Impregnating Agent | Service Life |
|---|---|---|
| 1 | Sulfamic acid sodium salt | 260 |
| 2 | Taurine sodium salt | 195 |
| 3 | N—methyl taurine sodium salt | 169 |
| 4 | Sulfanilic acid sodium salt | 154+ |
| 5 | Metanilic acid sodium salt | 154 |
| 6 | β-Alanine sodium salt | 120+ |
| 7 | p-Aminobenzoic acid sodium salt | 120+ |
| 8 | 2-Amino-1-butanol | 120+ |
| 9 | Diethanol amine | 120+ |
| 10 | Methane sulfonamide | 120+ |
| 11 | 6-Amino-1,3-naphthalene disulfonic acid disodium salt | 132 |

-continued

| Example | Impregnating Agent | Service Life |
|---|---|---|
| 12 | Succinimide | 120+ |
| 13 | 10% p-Phenylene diamine (from methanol) | 120+ |
| 14 | Glutamic acid disodium salt | 120+ |
| 15 | Acetamide | <5 |
| 16 | 13% N—cyanoacetamide | <5 |
| 17 | Saccharine sodium salt | <5 |
| 18 | Urea | <5 |
| 19 | 15% p-Dimethylamino benzoic acid sodium salt | <5 |
| 20 | 10% Triethanol amine | <5 |
| 21 | Nitrilotriacetic acid trisodium salt | <5 |
| 22 | 5% Triethylene diamine | <5 |
| 23 | 2-Acrylamido-2-methylpropane sulfonic acid sodium salt | <5 |
| 24 | Sulfamic acid | <5 |
| 25 | Glycine | <5 |
| 26 | Untreated carbon-control | <5 |

In addition to reactivity toward formaldehyde, practical utility requires that the impregnating amino compound have high solubility in water and either low vapor pressure or high affinity for the solid support. Water solubility is necessary because organic solvents are expensive, difficult to process and may compete with the impregnating amino compound for adsorption sites on the solid support. High support affinity is required because weakly adsorbed or volatile agents would be desorbed during use as air passes through the filter media resulting in loss of reactive capacity for formaldehyde and release of another material into the air. An equivalent weight of less than about 400 g/reactive amine group is also a practical limit on the impregnating agent to ensure adequate capacity for formaldehyde.

Amino compounds with polar or ionic substituent groups satisfy both of the above requirements. Compounds with substituent groups such as amino, hydroxyl or acid salts provide both high water solubility and low volatility as well as high reactivity toward formaldehyde gas in the adsorbed state. However, not all substituent groups show sufficiently high formaldehyde activity. For example, amino compounds with acidic substituents exist in a zwitterionic or internal salt form and the protonated amino group of this form is not reactive toward formaldehyde (Examples 24 and 25). However, the acid neutralized salt forms of both sulfonic and carboxylic acid substituted amino compounds are useful (Examples 1–7, and 11).

Hydroxyl and amino substituents also are useful (Examples 8, 9 and 13). The reactive amino site may be either primary or secondary (Examples 1–9, and 11) but not tertiary (Examples 19–22). Single carbonyl substitution at the nitrogen atom to form amides (Examples 15, 16, 18 and 23) inhibits activity but double carbonyl substitution promotes reactivity (Example 12). Also, sulfonyl substitution at the nitrogen atom to form sulfonamides (Example 10) promotes reactivity.

Untreated activated carbon tested against formaldehyde using the respirator bench test had very poor service life (Example 26).

EXAMPLES 27–30

Sorbents were prepared as in Example 1 except that the concentration of the sodium sulfamate impregnating agent was varied from 5% to 40%. Service life was tested as described earlier. Results given below show that service life increases with the amount of sodium sulfamate deposited on the activated carbon and that sodium sulfamate is effective even at low levels.

| Example | Sodium Sulfamate Concentration | Service Life |
|---|---|---|
| 27 | 5% | 80 min. |
| 28 | 10% | 127 |
| 1 | 20% | 260 |
| 29 | 30% | 343 |
| 30 | 40% | 575 |

EXAMPLES 31–32

Sorbents were prepared using 20% sodium sulfamate as in Example 1 using different high surface area solids in place of activated carbon. Silica gel dessicant from Davison Chemical was 6×12 inch. Activated alumina (F-1 from Alcoa) was 8×14 mesh. Results of service life tests show the effectiveness of sodium sulfamate on these solid supports.

| Example | Solid Support | Service Life |
|---|---|---|
| 31 | Silica Gel | 231 min. |
| 32 | Activated Alumina | 175 min. |

EXAMPLE 33

100 parts of activated carbon (Witco 965, 12×20 mesh) was added to 200 parts of a solution containing 10% phenol and 2% sulfuric acid; after 60 minutes the excess solution was filtered off and the sorbent dried until moisture content was less than 2%. Service life of the sorbent tested as described in previous examples was less than 5 minutes.

I claim:
1. Granular sorbent material for removal of formaldehyde from ambient air comprising a high surface area solid support impregnated with a water soluble, substantially non-volatile impregnating agent containing a sufficiently reactive primary or secondary substituted trivalent nitrogen site bearing zero or two carbonyl substituents attached directly to the nitrogen site and having equivalent weight of said reactive nitrogen site of less than about 400.

2. Granular sorbent material for removal of formaldehyde from ambient air according to claim 1 wherein said high surface area solid support is activated carbon.

3. Granular sorbent material for removal of formaldehyde from ambient air according to claim 1 wherein said high surface area solid support is silica gel.

4. Granular sorbent material for removal of formaldehyde from ambient air according to claim 1 wherein said high surface area solid support is activated alumina.

5. Granular sorbent material for removal of formaldehyde from ambient air according to claim 1 wherein said impregnating agent is the acid neutralized form of an amino substituted carboxylic or sulfonic acid.

6. Granular sorbent material for removal of formaldehyde from ambient air according to claim 1 wherein said impregnating agent is an amino substituted alcohol or phenol.

7. Granular sorbent material for removal of formaldehyde from ambient air according to claim 1 wherein said impregnating agent is an aliphatic or aromatic diamine.

8. Granular sorbent material for removal of formaldehyde from ambient air according to claim 1 wherein said impregnating agent is an imide.

9. Granular sorbent material for removal of formaldehyde from ambient air according to claim 1 wherein said impregnating agent is a sulfonamide.

10. Granular sorbent material for removal of formaldehyde from ambient air according to claim 1 wherein said impregnating agent is an alkali or alkaline earth metal salt of sulfamic acid.

* * * * *